United States Patent [19]

Denkowski et al.

[11] 4,280,373
[45] Jul. 28, 1981

[54] PORTABLE DRIVE UNIT FOR VALVE ACTUATOR

[75] Inventors: Walter J. Denkowski, Rustburg; Daniel S. Warsing, Lynchburg, both of Va.

[73] Assignee: Philadelphia Gear Corporation, King of Prussia, Pa.

[21] Appl. No.: 96,505

[22] Filed: Nov. 21, 1979

[51] Int. Cl.³ .................... F16K 31/12; F16K 31/44
[52] U.S. Cl. .............................................. 74/625; 64/3; 74/329; 81/57.27; 251/14; 173/163
[58] Field of Search .................. 64/2, 3; 74/625, 329; 81/57.11–57.14, 57.27, 57.29, 57.3, 57.31, 57.43, 90 B, 90 F; 137/269, 271; 251/14, 130, 291, 292; 285/320; 173/12, 162, 163

[56] References Cited

U.S. PATENT DOCUMENTS

| 648,363 | 4/1900 | Stultz et al. | 285/320 X |
|---|---|---|---|
| 1,260,080 | 3/1918 | Singer | 64/2 R X |
| 1,755,432 | 4/1930 | Dean | 251/291 X |
| 2,042,574 | 6/1936 | Wood et al. | 81/57.13 |
| 2,297,597 | 9/1942 | White | 251/291 X |
| 2,370,885 | 3/1945 | Sohm | 74/329 X |
| 2,456,744 | 12/1948 | Stoberg | 285/320 X |
| 2,479,750 | 8/1949 | Lewandowski | 173/163 X |
| 2,762,403 | 9/1956 | Ferm et al. | 81/57.11 X |
| 2,914,305 | 11/1959 | Wink | 173/163 X |
| 3,335,743 | 8/1967 | McInerney | 137/269 X |
| 3,616,867 | 11/1971 | Celli | 173/163 |
| 3,680,608 | 8/1972 | Emmerich et al. | 173/162 X |
| 3,687,415 | 8/1972 | Turkot | 251/130 X |
| 3,792,737 | 2/1974 | Bratt | 173/12 |
| 3,847,039 | 11/1974 | Azuma | 81/57.27 X |
| 3,975,966 | 8/1976 | Gruzinger | 74/329 |

FOREIGN PATENT DOCUMENTS 1038427  8/1966  United Kingdom ................. 173/12

Primary Examiner—Lawrence J. Staab
Attorney, Agent, or Firm—Paul & Paul

[57] ABSTRACT

A portable drive unit for a valve actuator includes a portable two-cycle or four-cycle gasoline engine and a gear reducer. The gasoline engine is bolted, through vibration damper means, to the housing or gear box of the gear reducer. The gear box is clamped to the valve actuator through an annular clamp and clamp-receiving adapter structure which also includes vibration damper means. A flexible sleeve coupling in the bore of the annular clamp and clamp-receiving adapter couples the output shaft of the gear reducer to the handwheel input shaft of the valve actuator.

18 Claims, 6 Drawing Figures

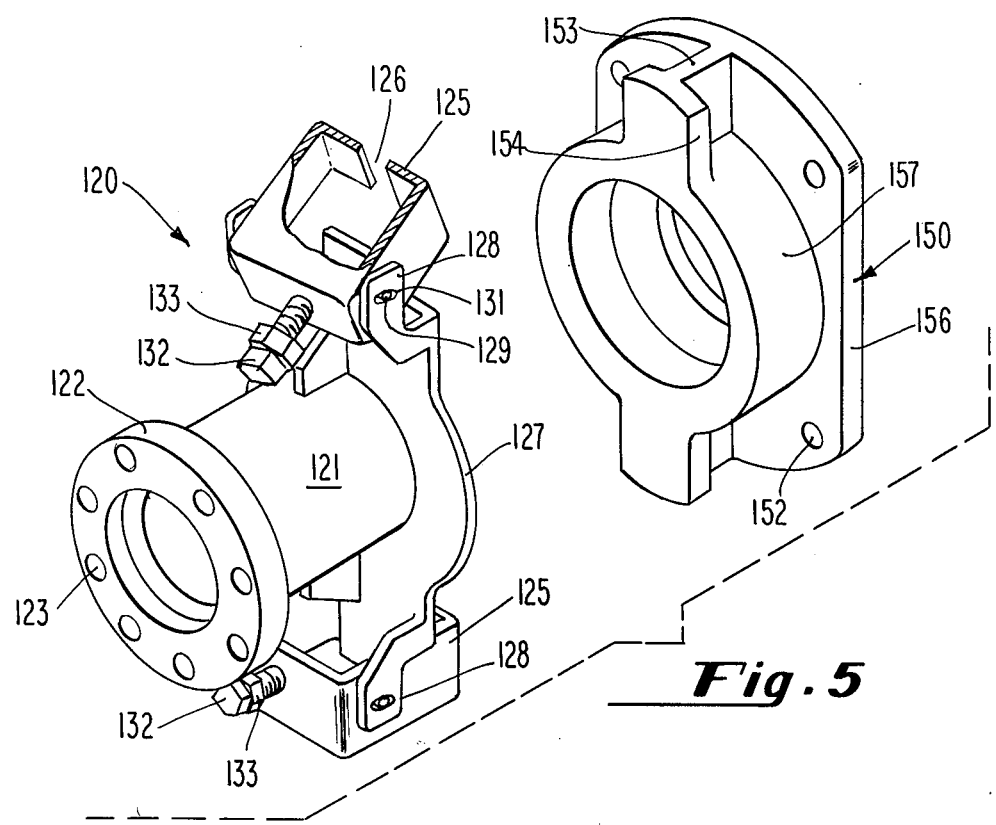
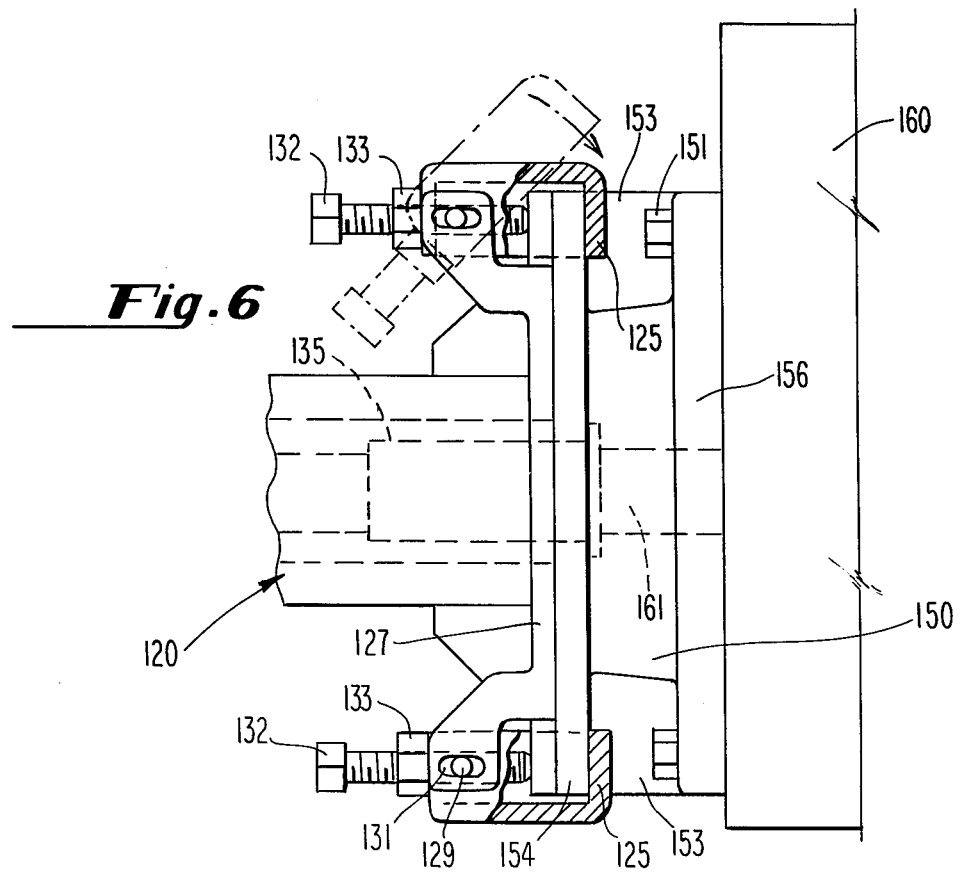

PORTABLE DRIVE UNIT FOR VALVE ACTUATOR

BACKGROUND OF THE INVENTION

This invention relates to power driven valve actuators, particularly large size power driven valve actuators.

In the event of a power failure, manual operation of a large size valve actuator by a handwheel is difficult because of the heavy physical effort required to turn the handwheel through the large number of turns required to close or open the valve.

SUMMARY OF THE INVENTION

A principal object of the present invention is to provide portable power drive means adapted to be connected to, and to drive, the handwheel shaft of larger size valve actuators in the event of a power failure.

The foregoing object is achieved by providing a two-cycle or four-cycle gasoline engine for driving, through a centrifugal clutch, a gear reducer unit which is connectible by vibration-absorbing annular clamp means to the valve actuator at the location of the handwheel shaft. The output shaft of the gear reducer is connectible by a flexible coupling to the handwheel shaft. The gear reducer may be single speed or two speed. The two-speed version has the advantage of providing a drive which can stroke the valve at high RPM and low torque, and then be changed to low RPM and high torque to seat the valve.

BRIEF DESCRIPTION OF THE DRAWINGS

FIG. 2 is also a view looking along the line 2—2 of FIG. 3.

FIG. 5 is a perspective showing of the clamp and clamp-receiving adapter.

FIG. 6 shows the clamp secured to the adapter which is bolted to the valve actuator.

DETAILED DESCRIPTION OF THE PREFERRED EMBODIMENTS

Figure 1:
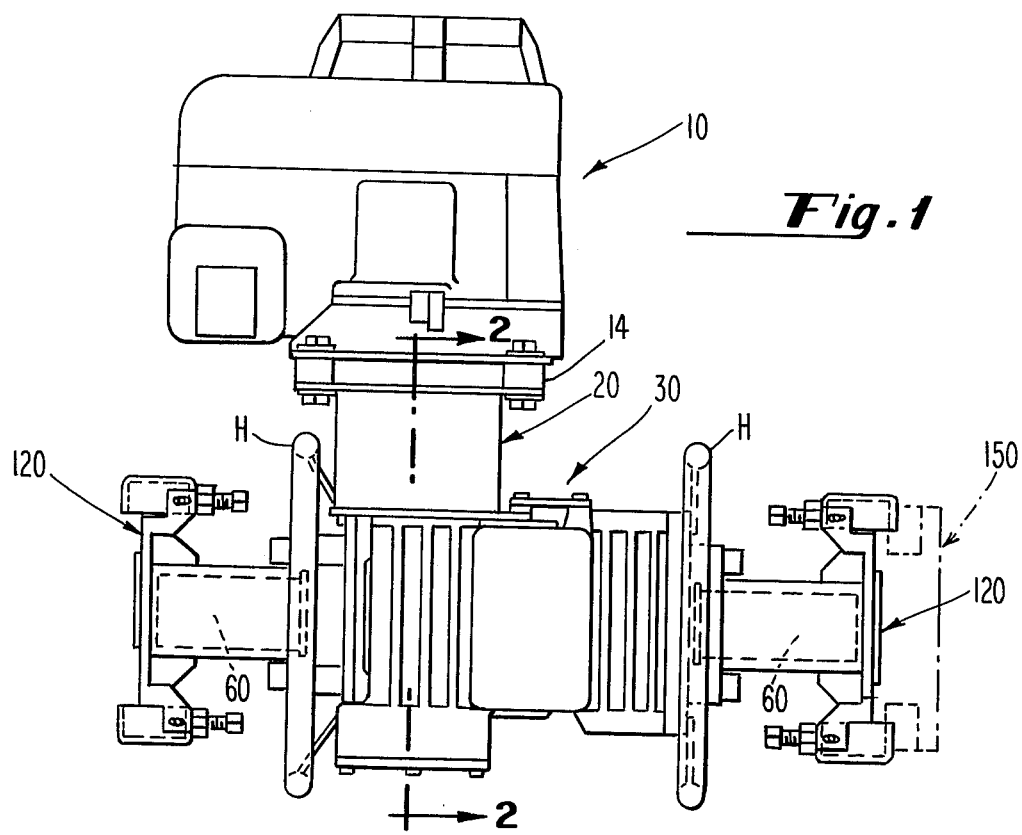
FIG. 1 is a diagrammatic top plan view of a portable drive unit according to the present invention showing the gasoline engine and the gear reduction unit.

FIG. 1 shows a portable drive unit according to the present invention. This unit consists essentially of a portable gasoline engine 10 and a gear-reduction unit 30. The portable gasoline engine 10 is shown connected through resilient vibration-absorbing means 14 to the housing of a centrifugal clutch 20 which is secured to a gear box which houses the gear-reduction unit 30. Gear-reduction unit 30 may be single speed or two-speed. A pair of handles H are provided to enable the attendant to conveniently lift, carry, and handle the portable drive unit. An annular clamp 120 is provided at both ends of output shaft 60 of the gear-reduction unit. Clamp 120 is adapted to connect the portable drive unit to the valve actuator by way of a clamp receiving member 150 which is bolted or otherwise secured to the valve actuator.

Figure 2:
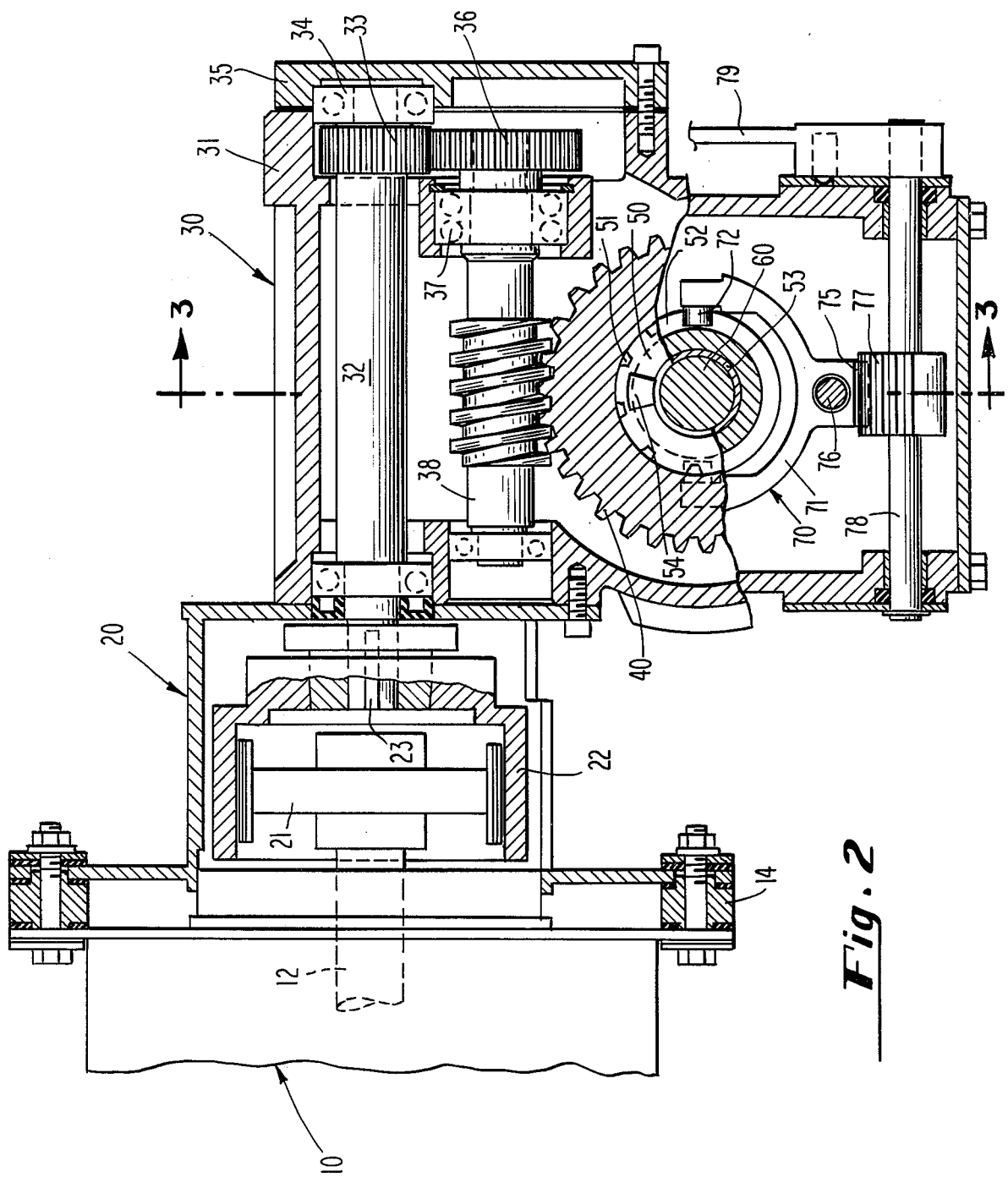
FIG. 2 is a view, in section, looking along the line 2—2 of FIG. 1, showing the centrifugal clutch and worm gear drive.

Reference is next made to FIG. 2. FIG. 2 shows the portable gasoline engine 10 connected through resilient vibration damper means 14 to the housing of the centrifugal clutch 20. Centrifugal clutch 20 may be any one of a number of commercially available centrifugal clutches. Accordingly, no details of such centrifugal clutch need be given. In FIG. 2, the output shaft 12 of the portable gasoline engine 10 drives clutch input member 21 which drives output member 22 which is keyed, as by key 23, to input shaft 32 of the gear reducer. Input shaft 32 is supported in bearings 34. Keyed to shaft 32 is a pinion 33 which is in mesh with a speed-reducing gear 36 keyed to a worm shaft 38 which is supported in bearings 37.

Figure 3:
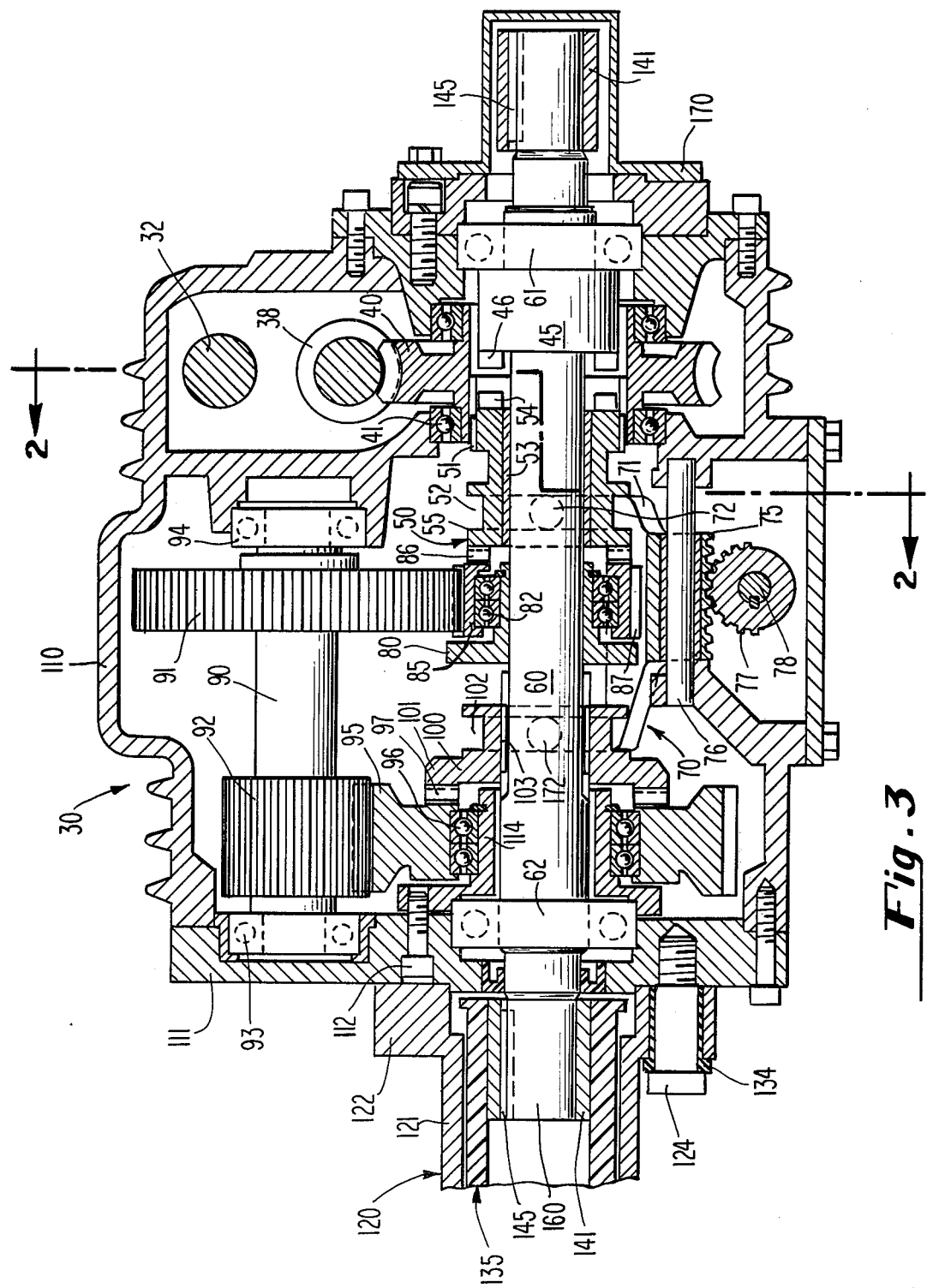
FIG. 3 is a view, in section, looking along the line 3—3 of FIG. 2, showing the two-speed drive.

As shown in FIG. 3, the worm on shaft 38 drives a gear 40 which is splined, as by splines 51, to a clutch member 50 which is supported, as by sleeve bearing 53, for free rotation about output shaft 60 of the gear reduction unit. Clutch member 50 is slidable along the shaft 60, as by means of a manually operable shift fork 70, operated by lever 79. As seen in FIGS. 2 and 3, rollers 72 of shift fork 70 engage the sidewalls of groove 52 so that movement of fork 70 in the axial direction of output shaft 60 causes clutch 50 to move slidingly in one axial direction or the other on output shaft 60.

The yoke portion of shift fork 70 is supported on a shaft 76 mounted in the fixed housing of the gear box. Fork 70 has a racklike undersurface 75 which is engaged by the teeth of pinion 77 mounted on a pivot shaft 78. By means of lever 79, the attendant may pivot the shaft 78 in one direction or the other, thereby to rotate the gear 77 and, through rack 75, shift the fork 70 in one axial direction or the other relative to output shaft 60.

Keyed on shaft 60 is a collar 45 having a pair of lugs 46 which project from collar 45 in the axial direction of shaft 60. When clutch 50 is moved to the right by shift fork 70, from the position shown in FIG. 3, the lugs 46 of collar 45 are adapted to be engaged, in face-on-face engagement, by lugs 54 which project axially from clutch 50 in the direction of collar 45.

Supported on output shaft 60 is a flanged sleeve bearing 80 which supports roller bearings 82 which in turn support pinion member 85 having a pair of lugs 86 which extend axially in the direction of lugs (not numbered) on clutch 50 for face-on-face engagement therewith. Pinion 85 is in mesh with and drives a larger-diameter gear 91 mounted on and keyed to a shaft 90 which is supported for rotation in bearings 93 and 94.

Also mounted on and keyed to shaft 90 is an output pinion 92 which is in mesh with and drives a larger-diameter gear 95 which is mounted, as by bearings 96, on a flanged sleeve 114 which is bolted as by bolts 112, to end plate 111 of the frame or housing 110 of the gear reduction unit 30. Gear 95 is provided with a pair of lugs 97 which extend axially in the direction of lugs (not numbered) on a second clutch member 100. Clutch 100 is keyed, as by splines 103, to output shaft 60. Clutch 100 is provided with an annular groove 102 which receives a roller 172 of shift fork 70 so that, when fork 70 is shifted axially relative to output shaft 60, both of the clutch members 50 and 100 are shifted simultaneously and in the same axial direction.

Bolted to end plate 111 of housing 110 containing gear-reduction unit 30, is an annular clamp device 120. Clamp device 120 is shown in perspective in FIG. 5 and in diagrammatic side view in FIG. 6. However, it should be noted that in FIGS. 5 and 6, clamp device 120 is shown facing in a direction opposite to that in which it is facing in FIG. 3. As seen in FIG. 3, annular flange 122 is bolted, as by bolts 124 in bolt holes 123, to end plate 111. A portion only of the barrel 121 is shown in FIG. 3. The clamp end, containing the pair of pivotal clamps 125 (FIGS. 5 and 6) is not shown in FIG. 3.

Referring now to FIGS. 5 and 6, a clamp-receiver 150 is provided having a flange plate portion 156 adapted to be bolted, as by bolts 151 in bolt holes 152, to the valve actuator housing 160 (FIG. 6). Receiver 150 has a short barrel portion 157, and projecting therefrom, in opposite radial directions, are ears 154, T-shaped in cross section, for receiving the pivotal clamps 125. The legs 153 of the ears 154 are received within the slots 126 of the clamps 125.

Clamps 125 are pivotal on pins 129 supported in slots 131 of tab portions 128 of end plate 127. Clamps 125 are tightened (and loosened) by bolts 132 and locknuts 133.

As seen in FIG. 6, the clamp-receiver 150 is bolted, as by bolts 151 through holes 152, to the housing 160 of the valve actuator. As seen in FIG. 3, clamp device 120 is bolted, as by bolts 124 through bolt holes 123 (FIG. 5), to the end plate 111 of the gear reducer 30.

Figure 4:
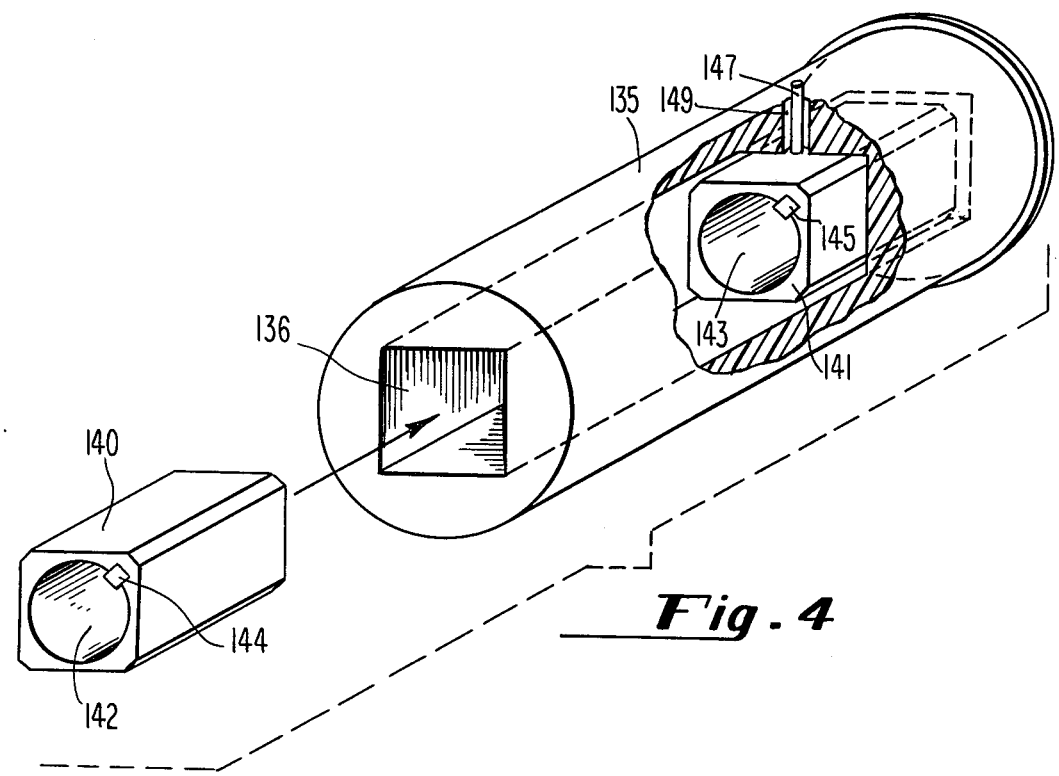
FIG. 4 is a diagrammatic perspective view of the flexible coupling.

Projecting into the circular axial opening of the clamp device 120 is the end 160 of output shaft 60. Shaft end 160 is provided with a keyway which receives a key 145 which secures a drive block 141 to the end 160 of output shaft 60. Drive block 141 has an axial bore 143 of circular cross section for receiving the shaft end 160, but the outer cross-sectional shape of drive block is square, with beveled edges. The generally square drive block 141 is received within the correspondingly square axial opening 136 in a cylindrical flexible coupling 135 (FIG. 4). A lock pin 147 is inserted through a hole 149 in coupling 135 and is received within a hole in drive block 141. Coupling 135 may preferably be made of elastic material.

Projecting into the circular axial opening of clamp-receiver 150 (FIG. 6) is the end 161 of the handwheel shaft of the valve actuator, from which the handwheel has been removed. The end 161 of the handwheel shaft has a keyway (not shown) which receives key 144 (FIG. 4). In a manner similar to that described above with respect to the end 160 of output shaft 60, a square drive block 140 having a circular opening 142 is slid over the end 161 of the handwheel shaft and locked in place by a key 144. Drive block 140 and the end 161 of the handwheel shaft are received within the square axial opening 136 in the flexible coupling 135 at the other end of the coupling from that which receives drive block 141 and the end 160 of the gear-reducer output shaft 60.

OPERATION

When a power failure occurs, or when power is not available, the attendant removes the handwheel (not shown) from the handwheel shaft. (The drive block 140 and key 144 are on the handwheel shaft 161 and the handwheel mounts directly on the drive block 140). The clamp-receiving adapter device 150 (FIGS. 5-6) is permanently mounted on the valve actuator housing 160. The keyway end of the handwheel shaft 161 projects into the circular axial bore of the adapter 150.

The attendant then mounts the clamp device 120, flexible coupling 135 and pin 147 on one end or the other of the gear reducer output shaft 60 (FIG. 3) according to the direction of rotation desired. If the valve is to be closed, the attendant mounts the clamp device 120 at one end, as for example, on the end plate 111 and bolts it in place as by bolts 124, as illustrated in FIG. 3. If the valve is to be opened, the attendant mounts the clamp device 120 at the other end of the output shaft 60. To do so, he first removes cover plate 170 (FIG. 3). (The drive block 141 and key 145 are supplied on both ends of the output shaft 60.)

With the clamp device 120 bolted in the desired position to the housing of the gear reducer 30, the attendant is now ready to mount the portable drive unit comprising the gasoline engine 10 and the gear reduction unit 30 (FIG. 1) onto the valve actuator. But before doing so, he first starts the gasoline engine 10. With the gasoline engine 10 running at idling speed, the centrifugal clutch 21-22 does not transmit energy to the gear reducer 30.

To mount the portable drive unit, the flexible coupling 135 is inserted on the square drive block 140 on the handwheel shaft. The pivotal clamps 125 of clamp device 120 are then secured onto the ears 154 of the clamp-receiving adapter device 150 and the volts 132 tightened and locked as by lock nuts 133 (FIG. 6).

To open (or close) the valve, the speed of the two-cycle or four-cycle gasoline engine 10 is accelerated. When the engine speed is sufficient, centrifugal clutch input member 21 drives output member 22 (FIG. 2) which drives shaft 32. Shaft 32, through pinions 33 and 36, drives worm shaft 38 and gear 40. And, through splines 51, gear 40 drives clutch member 50 (FIG. 3).

If clutch 50 is in the position shown in FIG. 3, the clutch 50 through lug-on-lug engagement at 86, drives pinion 85, gear 91, shaft 90, gear 92 and gear 95, and through lug-on-lug engagement at 97 drives a second clutch member 100. Since second clutch member 100 is splined to output shaft 60, output shaft 60 is driven. Since the gear train shown in FIG. 2 is a speed-reducing arrangement, output shaft 60 is driven at a reduced speed, relative to that of input gear 40, but the direction of the drive is not changed.

The speed-reduction path just described is preferably used during final closing and seating of the valve when low speed and high torque are desirable. Low speed and high torque may also be desired when opening a stuck valve. At other times, i.e., during stroking of the valve, high speed and low torque are preferable. In such case, the attendant shifts the clutches 50 and 100 to the right from the position shown in FIG. 3. He does this by operating lever 79 (FIG. 2) to turn pivot shaft 78 (FIGS. 2-3). This rotates gear 77 and causes rack 75 to shift axially to the right relative to output shaft 60. This shifts fork 70 to the right, and since fork rollers 72 and 172 are in grooves 52 and 102, respectively, of clutch members 50 and 100, respectively, the two clutch members 50 and 100 are shifted to the right when the lever 79 is operated as just described.

When the two clutch members are shifted to the right, the lugs 54 on clutch member 50 engage lugs 46 on collar 45, whereas the lugs 86 on pinion 85 become separated from the corresponding lugs on clutch 50, and lugs 97 on pinion 95 become separated from lugs on clutch member 100. As a result, gear 40 no longer drives the speed-reducer gear train. Instead, gear 40 drives collar 45 through splines 51, clutch member 50 and lugs 54 and 46. Since collar 45 is keyed to output shaft 60, output shaft 60 is driven. The direction of rotation of shaft 60 is the same as when the shaft is driven through gear train 85, 91, 92, 95, but the speed is greater.

When output shaft 60 is driven at either of the two speeds described above, drive block 141 is driven and so is flexible coupling 135. Flexible coupling 135 drives block 140 which is keyed to and drives the handwheel shaft 161 of the valve actuator.

As previously indicated, to change the direction of rotation of the handwheel shaft 161, the portable drive unit is reversed and the coupling to the handwheel shaft 161 is made at the other end of the gear-reducer output shaft 60. Handles H shown in FIG. 1 are used to lift and carry the portable unit.

It is to be noted that the gasoline engine 10 is rigidly mounted to the housing 20 of the centrifugal clutch through vibration dampers 14 (FIGS. 1–2) to minimize the transmission of vibration to the gear reduction housing or gear box 30. The gear box 30 is rigidly mounted to the valve actuator 160 by way of the adapter mechanism comprising the clamp 120 and clamp receiver 150. Clamp 120 utilizes dampers 134 (FIG. 3) to control vibratory stresses in these adapter pieces. The handwheel shaft 161 of the valve actuator is coupled to the gear box 30 through the resilient sleeve coupling 135 which absorbs misalignment between the gear box output shaft 60 and the handwheel shaft 161 of the valve actuator.

A two-speed gear reducer unit has been illustrated and described but a single speed unit is also provided. However, the single speed unit has not been specifically illustrated since its construction would be obvious in view of what has already been described. As already noted, the two-speed unit has certain advantages.

It will be seen that the present invention provides a portable drive unit which may be used in case of power failure to operate large valve actuators. The unit replaces manual operation which has heretofore been used but which has the disadvantages, so far as the larger valves are concerned, of requiring a large number of handwheel turns at considerable physical effort.

The capability of mounting the portable drive unit on the valve actuator while the gasoline engine is running is important from a practical point of view in view of the inaccessibility of many valves.

What is claimed is:

1. A portable drive unit for a valve actuator having a handwheel input shaft, said drive unit comprising:
   a. a source of torque power;
   b. a clutch;
   c. a gear reducer having input means and an output shaft;
   d. an annular adapter comprising;
      d-1 an annular clamp device adapted to be secured to one of said gear reducer and valve actuator, said clamp device including a pair of pivotal clamp members;
      d-2 an annular clamp receiver adapted to be secured to the other of said valve actuator and gear reducer, said receiver including a pair of ears for receiving said pivotal clamp members;
   e. a flexible coupling insertable within the axial bores of said annular clamp device and annular clamp receiver, said coupling adapted to be connected at one end to the handwheel input shaft of said valve actuator and to be connected at the other end to the output shaft of said gear reducer; and
   f. means, including said clutch, for connecting said source of torque power to said input means of said gear reducer;
   g. said flexible coupling comprising:
      g-1 a resilient sleeve having an axial bore of rectangular cross section;
      g-2 first and second drive blocks, one at each end of said resilient sleeve;
      g-3 each of said drive blocks having a generally rectangular cross section corresponding to that of the axial bore of said sleeve;
      g-4 each of said drive blocks being received within said sleeve bore;
      g-5 said drive blocks having bores of circular cross section and diameters corresponding to those of the handwheel input shaft and of the output shaft of said gear reducer; and
   h. means for securing said drive blocks to said input and output shafts.

2. Apparatus according to claim 1 wherein said source of torque power is a portable internal combustion engine.

3. Apparatus according to claim 2 wherein said internal combustion engine is a portable gasoline engine.

4. Apparatus according to claims 1, 2 or 3 wherein said clutch is a centrifugal clutch.

5. Apparatus according to claim 4 wherein said clamp device is connected to said gear reducer.

6. A portable drive unit for a valve actuator having a handwheel input shaft, said drive unit comprising:
   a. a source of torque power;
   b. a main clutch;
   c. a two-speed gear reducer having input means and an output shaft;
   d. an annular adapter comprising;
      d-1 an annular clamp device adapted to be secured to one of said gear reducer and valve actuator, said clamp device including a pair of pivotal clamp members;
      d-2 an annular receiver adapted to be secured to the other of said valve actuator and gear reducer, said receiver including a pair of ears for receiving said pivotal clamp members;
   e. a flexible coupling insertable within the axial bores of said annular clamp device and annular receiver, said coupling adapted to be connected at one end to the handwheel input shaft of said valve actuator and to be connected at the other end to the output shaft of said gear reducer; and
   f. means, including said main clutch, for connecting said source of torque power to said input means of said gear reducer;
   g. said two-speed gear reducer comprising:
      g-1 a first clutch member mounted for free rotation on the output shaft of the gear reducer;
      g-2 means connecting said first clutch member to said input means of said gear reducer for rotation therewith;
      g-3 a collar secured on said output shaft of said gear reducer for rotation therewith;
      g-4 first and second gear trains coupled together in series; each having input and output gears;
      g-5 means adapted to connect said first clutch member to the input gear of said first gear train;
      g-6 a second clutch member splined to said output shaft of said gear reducer for rotation therewith, said second clutch member adapted to be connected to the output gear of said second gear train;
      g-7 a shift fork for shifting simultaneously said first and second clutch members in the axial directions of said gear-reducer output shaft for coupling and de-coupling said input means of said gear reducer selectively to and from said collar and for coupling and de-coupling said input means to and from the input gear to said first gear train and for coupling and de-coupling said output gear of said second gear train from said second clutch member.

7. Apparatus according to claim 6 wherein said input means of said gear reducer includes:
 a. an input shaft;
 b. a worm shaft;
 c. pinions on said input and worm shafts in mesh with each other and
 d. a worm gear in mesh with the worm on said worm shaft.

8. Apparatus according to claim 7 wherein said means connecting said first clutch member to said input means of said gear reducer comprises a splined connection allowing for axial movement of said first clutch member on said output shaft while maintaining connection with said input means.

9. Apparatus according to claim 6 wherein said source of torque power is a portable gasoline engine.

10. Apparatus according to claim 6 wherein said main clutch is a centrifugal clutch.

11. Apparatus according to claim 6 wherein said clamp device is connected to said gear reducer and said receiver is connected to said valve actuator.

12. A portable drive unit for a valve actuator having a handwheel input shaft, said drive unit comprising:
 a. a portable gasoline engine;
 b. a gear reducer having an input shaft and an output shaft and means for interconnecting said input and output shafts;
 c. an annular two-piece clamping device, one annular piece adapted to be bolted to said valve actuator at the location of the handwheel input shaft, the other annular piece adapted to be bolted to said gear reducer at the location of the output shaft of said gear reducer, said one and other pieces adapted to be clamped together;
 d. a flexible coupling insertable within the axial openings of said annular clamping pieces, one end of said coupling adapted to be secured to said handwheel input shaft of said valve actuator and the other end of said coupling adapted to be secured to the output shaft of said gear reducer, and
 e. means, including a centrifugal clutch, for connecting said gasoline engine to said input shaft of said gear reducer;
 f. said flexible coupling comprising:
  f-1 a resilient sleeve having an axial bore of rectangular cross section;
  f-2 first and second drive blocks, one at each end of said resilient sleeve;
  f-3 each of said drive blocks having a generally rectangular cross section corresponding to that of the axial bore of said sleeve;
  f-4 each of said drive blocks being received within said sleeve bore;
  f-5 said drive blocks having bores of circular cross section and diameters corresponding to those of the handwheel input shaft and of the output shaft of said gear reducer; and
 g. means for securing said drive blocks to said input and output shafts.

13. Apparatus according to claim 12 wherein said means interconnecting said input and output shafts of said gear reducer includes:
 a. a worm shaft;
 b. pinions on said input and worm shafts in mesh with each other; and
 c. a worm gear in mesh with the worm on said worm shaft.

14. Apparatus according to claim 12 wherein said means connecting said gasoline engine to said gear reducer includes resilient vibration-absorbing means.

15. Apparatus according to claim 12 wherein said clamping device includes resilient vibration-absorbing means.

16. A portable drive unit for a valve actuator having a handwheel input shaft, said drive unit comprising:
 a. a portable gasoline engine;
 b. a two-speed gear reducer having an input shaft and an output shaft;
 c. means for interconnecting said input and output shafts, said interconnecting means including;
  c-1 a worm shaft;
  c-2 pinions on said input and worm shafts in mesh with each other; and
  c-3 a worm gear in mesh with the worm on said worm shaft;
 d. an annular two-piece clamping device, one annular piece adapted to be bolted to said valve actuator at the location of the handwheel input shaft, the other annular piece adapted to be bolted to said gear reducer at the location of the output shaft of said gear reducer, said one and other pieces adapted to be clamped together;
 e. a flexible coupling insertable within the axial openings of said annular clamping pieces, one end of said coupling adapted to be secured to said handwheel input shaft of said valve actuator and the other end of said coupling adapted to be secured to the output shaft of said gear reducer, and
 f. means, including a centrifugal clutch, for connecting said gasoline engine to said input shaft of said gear reducer;
 g. said two-speed gear reducer having;
  g-1 a first clutch member mounted for free rotation on the output shaft of the gear reducer;
  g-2 means connecting said first clutch member to said input means of said gear reducer for rotation therewith;
  g-3 a collar secured on said output shaft of said gear reducer for rotation therewith;
  g-4 first and second gear trains coupled together in series; each having input and output gears;
  g-5 means adapted to connect said first clutch member to the input gear of said first gear train;
  g-6 a second clutch member splined to said output shaft of said gear reducer for rotation therewith, said second clutch member adapted to be connected to the output gear of said second gear train; and
  g-7 a shift fork for shifting simultaneously said first and second clutch members in the axial directions of said gear-reducer output shaft for coupling and de-coupling said input means of said gear reducer selectively to and from said collar and for coupling and de-coupling said input means to and from the input gear to said first gear train and for coupling and de-coupling said output gear of said second gear train from said second clutch member.

17. Apparatus according to claim 16 wherein said means connecting said gasoline engine to said gear reducer includes resilient vibration-absorbing means.

18. Apparatus according to claim 16 wherein said clamping device includes resilient vibration-absorbing means.

* * * * *